US012223916B2

(12) United States Patent
Kim

(10) Patent No.: US 12,223,916 B2
(45) Date of Patent: Feb. 11, 2025

(54) DATA DRIVING CIRCUIT AND A DISPLAY DEVICE INCLUDING THE SAME

(71) Applicant: Samsung Display Co., Ltd., Yongin-Si (KR)

(72) Inventor: Subin Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 21 days.

(21) Appl. No.: 18/096,057

(22) Filed: Jan. 12, 2023

(65) Prior Publication Data

US 2023/0326415 A1 Oct. 12, 2023

(30) Foreign Application Priority Data

Apr. 12, 2022 (KR) ........................ 10-2022-0045207

(51) Int. Cl.
*G09G 3/3275* (2016.01)

(52) U.S. Cl.
CPC ... *G09G 3/3275* (2013.01); *G09G 2310/0289* (2013.01); *G09G 2320/0223* (2013.01); *G09G 2320/04* (2013.01)

(58) Field of Classification Search
CPC ........... G09G 3/3275; G09G 2310/027; G09G 3/3688; G09G 3/20; G09G 3/36; G09G 3/3692; G09G 2310/0251; G09G 2320/0223; G09G 2370/08; G09G 3/3611; G09G 5/222; G09G 3/3283; G09G 2310/0248; G09G 2310/0289; G09G 2310/08; G09G 5/008; G09G 5/022; G09G 5/06; G09G 5/10; G09G 5/18
See application file for complete search history.

(56) References Cited

U.S. PATENT DOCUMENTS

| | | | |
|---|---|---|---|
| 10,467,942 B2 | 11/2019 | Lee | |
| 11,132,978 B2 | 9/2021 | Lee et al. | |
| 11,276,370 B2 | 3/2022 | Kim et al. | |
| 2012/0306825 A1 | 12/2012 | Cho | |

(Continued)

FOREIGN PATENT DOCUMENTS

| | | | |
|---|---|---|---|
| CN | 102298916 A | * 12/2011 | ........... G09G 3/3688 |
| KR | 19980024406 A | * 7/1998 | ........... G09G 3/3688 |
| KR | 10-0909057 | 7/2009 | |

(Continued)

*Primary Examiner* — Nelson M Rosario
*Assistant Examiner* — Scott D Au
(74) *Attorney, Agent, or Firm* — F. CHAU & ASSOCIATES, LLC

(57) ABSTRACT

A data driving circuit including: a latch which receives an output image signal and outputs a latch data signal including a plurality of bits; a transition detector which compares the latch data signal of a current line with the latch data signal of a previous line, and outputs a first transition detection signal based on the comparison; a delay compensator which outputs a delay data signal obtained by delaying some of the plurality of bits of the latch data signal based on the first transition detection signal; a level shifter which outputs a level shift data signal obtained by changing a voltage level of the delay data signal; and an output circuit which converts the level shift data signal into a data signal and provides the data signal obtained by converting the level shift data signal to a data line.

15 Claims, 16 Drawing Sheets

(56) References Cited

U.S. PATENT DOCUMENTS

2019/0197938 A1 * 6/2019 Iwasa .................. G09G 3/2022

FOREIGN PATENT DOCUMENTS

| | | |
|---|---|---|
| KR | 10-2012-0133151 | 12/2012 |
| KR | 10-2017-0087832 | 7/2017 |
| KR | 10-2020-0108226 | 9/2020 |
| KR | 10-2020-0142623 | 12/2020 |

* cited by examiner

FIG. 7

| | Hp | Hc | TS1 (0111 1111 → 1000 0000) | TS2 (1000 0000 → 0111 1111) |
|---|---|---|---|---|
| DATA_1[8:1] | 1000 0000 | 0111 1111 | 0 | 1 |
| DATA_2[8:1] | 1011 1111 | 0110 1111 | 0 | 0 |
| DATA_3[8:1] | 0111 1111 | 1000 0000 | 1 | 0 |
| DATA_4[8:1] | 0111 1111 | 0111 1110 | 0 | 0 |
| ⋮ | ⋮ | ⋮ | ⋮ | ⋮ |
| DATA_m[8:1] | 1000 0000 | 0111 1111 | 0 | 1 |

DATA DRIVING CIRCUIT AND A DISPLAY DEVICE INCLUDING THE SAME

CROSS-REFERENCE TO RELATED APPLICATION

This application claims priority under 35 U.S.C. § 119 to Korean Patent Application No. 10-2022-0045207 filed on Apr. 12, 2022, in the Korean Intellectual Property Office, the disclosure of which is incorporated by reference herein in its entirety.

TECHNICAL FIELD

Embodiments of the present disclosure described herein relate to a display device, and more particularly, to a display device including a data driving circuit.

DISCUSSION OF RELATED ART

A display device is an output device for presentation of information in visual form. As an example, a display device includes a display panel for displaying an image and a driving circuit for driving the display panel. The display panel includes a plurality of scan lines, a plurality of data lines, and a plurality of pixels. The scan lines and the data lines may intersect each other and the pixels may be formed at the intersections. The driving circuit includes a data driving circuit that outputs a data driving signal to the data lines, a scan driving circuit that outputs a scan signal for driving the scan lines, and a driving controller that controls the data driving circuit and the scan driving circuit.

Such a display device may display an image by outputting the scan signal to the scan line connected to a pixel to be displayed and providing a data voltage corresponding to an image to be displayed to the data line connected to the pixel.

SUMMARY

Embodiments of the present disclosure provide a data driving circuit and a display device capable of preventing deterioration in display quality.

According to an embodiment of the present disclosure, a data driving circuit includes: a latch which receives an output image signal and outputs a latch data signal including a plurality of bits; a transition detector which compares the latch data signal of a current line with the latch data signal of a previous line, and outputs a first transition detection signal based on the comparison; a delay compensator which outputs a delay data signal obtained by delaying some of the plurality of bits of the latch data signal based on the first transition detection signal; a level shifter which outputs a level shift data signal obtained by changing a voltage level of the delay data signal; and an output circuit which converts the level shift data signal into a data signal and provides the data signal obtained by converting the level shift data signal to a data line.

The transition detector outputs the first transition detection signal as a first value when the latch data signal of the current line and the latch data signal of the previous line correspond to a first pattern.

The first pattern is a pattern in which a most significant bit of the latch data signal of the previous line is a first bit value, each of remaining lower bits except for the most significant bit of the latch data signal of the previous line is a second bit value, a most significant bit of the latch data signal of the current line is the second bit value, and each of remaining lower bits except for the most significant bit of the latch data signal of the current line is the first bit value.

The delay compensator includes: a counter which counts a number of the first transition detection signal having the first value in the current line, and outputs a first count signal based on the counted number; a delay controller which outputs a control signal when the first count signal is greater than a first reference value; and a delay circuit which outputs the delay data signal obtained by delaying some of the plurality of bits of the latch data signal in response to the control signal.

The delay circuit outputs the delay data signal by delaying some of lower bits of the plurality of bits of the latch data signal in response to the control signal.

The delay circuit outputs the delay data signal by delaying a most significant bit of the plurality of bits of the latch data signal in response to the control signal.

The delay circuit outputs the delay data signal by delaying remaining bits except for a most significant bit of the plurality of bits of the latch data signal in response to the control signal.

The transition detector: outputs the first transition detection signal as a first value when the latch data signal of the current line and the latch data signal of the previous line correspond to a first pattern, and outputs a second transition detection signal as the first value when the latch data signal of the current line and the latch data signal of the previous line correspond to a second pattern.

The delay compensator includes: a counter which counts a number of the first transition detection signal having the first value in the current line to output a first count signal, and counts a number of the second transition detection signal having the first value to output a second count signal; a delay controller which outputs a control signal based on a difference value between the first count signal and the second count signal; and a delay circuit which outputs the delay data signal obtained by delaying some of the plurality of bits of the latch data signal in response to the control signal.

The delay controller outputs the control signal such that some of the plurality of bits of the latch data signal are delayed when an absolute value of the difference value is greater than a reference value.

The delay circuit outputs the delay data signal by delaying remaining bits except for a most significant bit of the plurality of bits of the latch data signal in response to the control signal.

The delay circuit outputs the delay data signal by delaying a most significant bit of the plurality of bits of the latch data signal in response to the control signal.

According to an embodiment of the present disclosure, a data driving circuit includes: a latch which receives an output image signal and outputs a latch data signal including a plurality of bits; a transition detector which outputs a first transition detection signal of a first value when the latch data signal of a current line and the latch data signal of a previous line correspond to a first pattern, and outputs a second transition detection signal of the first value when the latch data signal of the current line and the latch data signal of the previous line correspond to a worst pattern; a delay compensator which outputs a delay data signal obtained by delaying some of the plurality of bits of the latch data signal based on a difference value between a number of the first transition detection signal having the first value in the current line and a number of the second transition detection signal having the first value in the current line; a level shifter which outputs a level shift data signal obtained by changing a voltage level of the delay data signal; and an output circuit which converts the level shift data signal into a data signal and provides the data signal obtained by converting the level shift data signal to a data line.

The delay compensator includes: a counter which counts a number of the first transition detection signal having the first value in the current line to output a first count signal, and counts a number of the second transition detection signal having the first value to output a second count signal; a delay controller which outputs a control signal when an absolute value of a difference value between the first count signal and the second count signal is greater than a reference value; and a delay circuit which outputs the delay data signal obtained by delaying some of the plurality of bits of the latch data signal in response to the control signal.

According to an embodiment of the present disclosure, a display device includes: a display panel including a plurality of pixels connected to a plurality of data lines; and a data driving circuit which receives an output image signal and provides a plurality of data signals to the plurality of data lines, and the data driving circuit includes: a latch which receives the output image signal and outputs a plurality of latch data signals each including a plurality of bits; a transition detector which compares the plurality of latch data signals of a current line with the plurality of latch data signals of a previous line, respectively, and outputs a first transition detection signal based on the comparison; a delay compensator which outputs a plurality of delay data signals obtained by delaying some of the plurality of bits of each of the plurality of latch data signals based on the first transition detection signal; a level shifter which outputs a plurality of level shift data signals obtained by changing a voltage level of each of the plurality of delay data signals; and an output circuit which converts the plurality of level shift data signals into the plurality of data signals and provides the data signals obtained by converting the plurality of level shift data signals to the plurality of data lines.

The transition detector outputs the first transition detection signal as a first value when a latch data signal of the current line and a latch data signal of the previous line corresponding to each of the data lines among the plurality of latch data signals of the current line and the plurality of latch data signals of the previous line correspond to a first pattern.

The delay compensator includes: a counter which counts a number of the first transition detection signal having the first value in the current line, and outputs a first count signal based on the counted number; a delay controller which outputs a control signal when the first count signal is greater than a first reference value; and a plurality of delay circuits which respectively correspond to the plurality of latch data signals, and wherein each of the plurality of delay circuits includes a plurality of delays which respectively correspond to the plurality of bits of a corresponding latch data signal of the plurality of latch data signals, and outputs the delay data signal obtained by delaying some of the plurality of bits of the corresponding latch data signal in response to the control signal.

Each of the plurality of delay circuits includes delays which output the delay data signal by delaying some of lower bits of the plurality of bits of the corresponding latch data signal in response to the control signal.

Each of the plurality of delay circuits outputs the delay data signal by delaying a most significant bit of the plurality of bits of the corresponding latch data signal in response to the control signal.

Each of the plurality of delay circuits outputs the delay data signal by delaying remaining bits except for a most significant bit of the plurality of bits of the corresponding latch data signal in response to the control signal.

The transition detector: outputs the first transition detection signal as a first value when the plurality of latch data signals of the current line and the plurality of latch data signals of the previous line correspond to a first pattern, and outputs a second transition detection signal as the first value when the plurality of latch data signals of the current line and the plurality of latch data signals of the previous line correspond to a second pattern.

The delay compensator includes: a counter which counts a number of the first transition detection signal having the first value in the current line to output a first count signal, and counts a number of the second transition detection signal having the first value to output a second count signal; a delay controller which outputs a control signal based on a difference value between the first count signal and the second count signal; and a plurality of delay circuits which respectively correspond to the plurality of latch data signals, and each of the plurality of delay circuits includes a plurality of delays which respectively correspond to the plurality of bits of a corresponding latch data signal of the plurality of latch data signals, and outputs the delay data signal obtained by delaying some of the plurality of bits of the corresponding latch data signal in response to the control signal, and wherein the delay controller outputs the control signal such that some of the plurality of bits of the corresponding latch data signal are delayed when an absolute value of the difference value is greater than a reference value.

According to an embodiment of the present disclosure, a data driving circuit includes: a latch which receives an image signal and outputs a latch data signal including a plurality of bits; a transition detector which compares the latch data signal of a current line with the latch data signal of a previous line, and outputs a first transition detection signal based on the comparison, wherein the first transition detection signal has a first value when the latch data signal of the current line and the latch data signal of the previous line correspond to a predetermined pattern; a delay compensator which outputs a delay data signal obtained by delaying some of the plurality of bits of the latch data signal based on the first transition detection signal; a level shifter which outputs a level shift data signal obtained by changing a voltage level of the delay data signal; and an output circuit which converts the level shift data signal into a data signal and provides the data signal obtained by converting the level shift data signal to a data line.

The predetermined pattern is a pattern in which a most significant bit of the latch data signal of the previous line is a first bit value, each of remaining lower bits except for the most significant bit of the latch data signal of the previous line is a second bit value, a most significant bit of the latch data signal of the current line is the second bit value, and each of remaining lower bits except for the most significant bit of the latch data signal of the current line is the first bit value.

The first bit value is 0 and the second bit value is 1.

BRIEF DESCRIPTION OF THE FIGURES

The above and other features of the present disclosure will become apparent by describing in detail embodiments thereof with reference to the accompanying drawings.

FIG. 7 is a diagram for describing an operation of a transition detector and a counter illustrated in FIG. 2, according to an embodiment of the present disclosure.

DETAILED DESCRIPTION OF THE EMBODIMENTS

Figure 1:
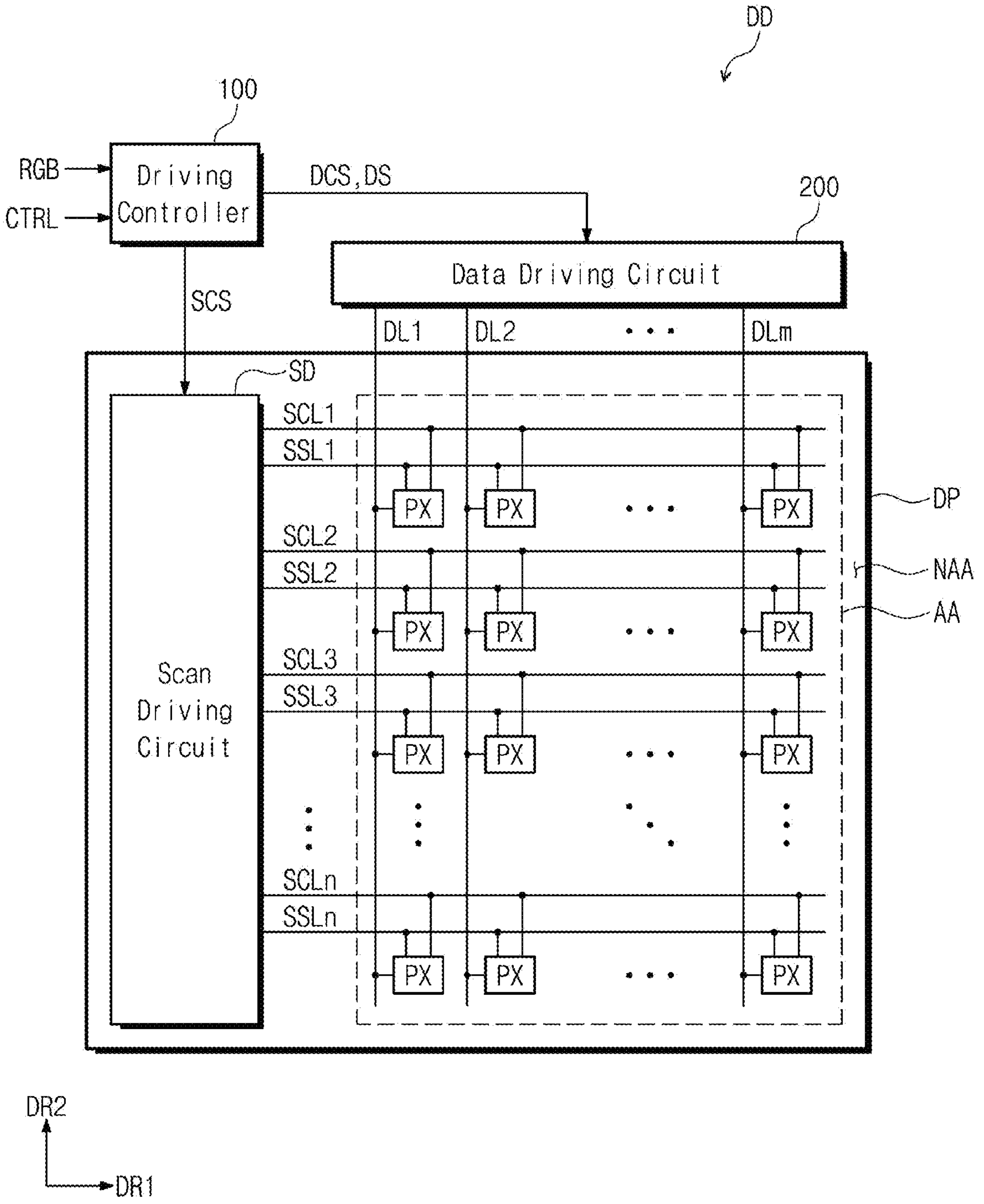
FIG. 1 is a block diagram of a display device, according to an embodiment of the present disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. In addition, in drawings, the thickness, ratio, and dimension of components are exaggerated to more effectively describe the technical contents. The term "and/or" includes one or more combinations of the associated listed items.

The terms "first", "second", "third", etc. are used to describe various components, but the components are not limited by the terms. The terms are used to differentiate one component from another component. For example, a first component may be named as a second component, and vice versa. A singular form, unless otherwise stated, includes a plural form.

In addition, the terms "under", "beneath", "on", and "above" are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted to have an ideal or excessively formal meaning unless explicitly defined in the present disclosure.

Hereinafter, embodiments of the present disclosure will be described with reference to the accompanying drawings.

FIG. 1 is a block diagram of a display device, according to an embodiment of the present disclosure.

Referring to FIG. 1, a display device DD includes a driving controller 100, a data driving circuit 200, and a display panel DP.

The driving controller 100 receives an input image signal RGB and a control signal CTRL. The driving controller 100 generates an output image signal DS obtained by converting a data format of the input image signal RGB to meet the interface specification of the data driving circuit 200. The driving controller 100 outputs a scan control signal SCS and a data control signal DCS.

The data driving circuit 200 receives the data control signal DCS and the output image signal DS from the driving controller 100. The data driving circuit 200 converts the output image signal DS into data signals and then outputs the data signals to a plurality of data lines DL1 to DLm to be described later. Each of the data signals may have a voltage level corresponding to a grayscale value of the output image signal DS. Each of the data signals may be an analog signal.

The display panel DP includes first scan lines SCL1 to SCLn, second scan lines SSL1 to SSLn, the data lines DL1 to DLm, and pixels PX. The display panel DP may further include a scan driving circuit SD. In an embodiment, the scan driving circuit SD is arranged at a first side of the display panel DP. However, the scan driving circuit SD may be arranged at a second side of the display panel DP opposite the first side. In addition, the scan driving circuit SD may include a first part disposed at the first side of the display panel DP and a second part disposed at a second side of the display panel DP. The first scan lines SCL1 to SCLn and the second scan lines SSL1 to SSLn extend from the scan driving circuit SD in a first direction DR1.

The driving controller 100, the data driving circuit 200, and the scan driving circuit SD may be driving circuits that provide data signals to the pixels PX of the display panel DP.

The display panel DP may be divided into an effective area AA and a non-effective area NAA. The effective area AA may be a display area and the non-effective area NAA may be a non-display area. The pixels PX may be disposed in the effective area AA, and the scan driving circuit SD may be disposed in the non-effective area NAA.

The first scan lines SCL1 to SCLn and the second scan lines SSL1 to SSLn are arranged to be spaced apart from one another in a second direction DR2. The data lines DL1 to DLm extend from the data driving circuit 200 in a direction opposite to the second direction DR2, and are arranged to be spaced apart from one another in the first direction DR1.

The plurality of pixels PX are electrically connected to the first scan lines SCL1 to SCLn, the second scan lines SSL2 to SSLn, and the data lines DL1 to DLm, respectively. For example, pixels PX in a first row may be connected to the scan lines SCL1 and SSL1. In addition, pixels PX in a second row may be connected to the scan lines SCL2 and SSL2, and pixels PX in a third row may be connected to the scan lines SCL3 and SSL3.

Each of the plurality of pixels PX may include a light emitting device and a pixel circuit for controlling light emission of the light emitting device. The pixel circuit may include a plurality of transistors and at least one capacitor. The scan driving circuit SD may include transistors formed through the same process as the pixel circuit. In an embodiment, each of the pixels PX may include an organic light emitting diode as a light emitting device. However, the present disclosure is not limited thereto.

The scan driving circuit SD receives the scan control signal SCS from the driving controller 100. The scan driving circuit SD may output first scan signals to the first scan lines SCL1 to SCLn and may output a second scan signals to the second scan lines SSL1 to SSLn, in response to the scan control signal SCS.

In an embodiment, the scan driving circuit SD is disposed at a first side of the effective area AA, but the present disclosure is not limited thereto. In an embodiment, the scan driving circuit SD may be disposed at the first side and a second side of the effective area AA, respectively.

Figure 2:
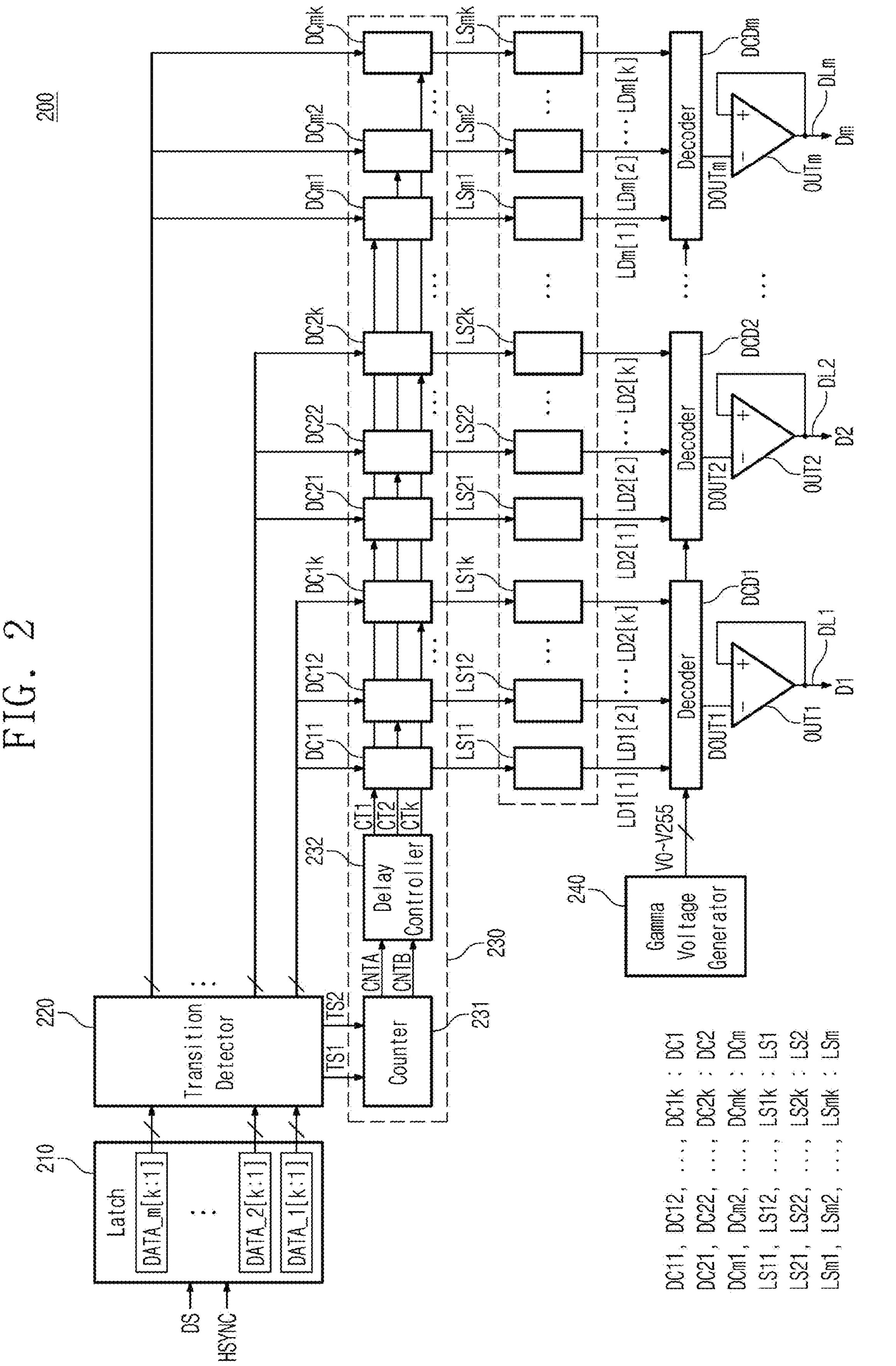
FIG. 2 is a block diagram of a data driving circuit, according to an embodiment of the present disclosure.

FIG. 2 is a block diagram of a data driving circuit, according to an embodiment of the present disclosure.

Referring to FIG. 2, the data driving circuit 200 includes a latch 210, a transition detector 220, a delay compensator 230, level shifters LS1, LS2, . . . , LSm, and an output circuit.

The delay compensator 230 may include a counter 231, a delay controller 232, and delay circuits DC1, DC2, . . . , DCm.

The output circuit includes a gamma voltage generator 240, decoders DCD1, DCD2, . . . , DCDm, and output buffers OUT1, OUT2, . . . , OUTm.

The latch 210 receives the output image signal DS and a synchronization signal HSYNC from the driving controller 100 illustrated in FIG. 1. The synchronization signal HSYNC may be a signal included in the data control signal DCS.

The latch 210 outputs latch data signals DATA_1[k:1], DATA_2[k:1], . . . , DATA_m[k:1] respectively corresponding to the data lines DL1, DL2, . . . , DLm in synchronization with the synchronization signal HSYNC. Each of the latch data signals DATA_1[k:1], DATA_2[k:1], . . . , DATA_m [k:1] may be a 'k' (where 'k' is a positive integer) bit digital signal.

The transition detector 220 determines whether each of the latch data signals DATA_1[k:1], DATA_2[k:1], . . . , DATA_m[k:1] corresponds to a worst pattern. For example, the transition detector 220 compares the latch data signal of a current line He (refer to FIG. 7) with the latch data signal of a previous line Hp (refer to FIG. 7), and outputs first and second transition signals TS1 and TS2.

For example, when the latch data signal of the current line He and the latch data signal of the previous line Hp correspond to a first worst pattern, the first transition signal TS1 has a first value. When the latch data signal of the current line He and the latch data signal of the previous line Hp correspond to a second worst pattern, the second transition signal TS2 has the first value.

The transition detector 220 may provide the latch data signals DATA_1[k:1], DATA_2[k:1], . . . , DATA_m[k:1] to the delay compensator 230.

The delay compensator 230 outputs a delay data signal obtained by delaying some of a plurality of bits of the latch data signal based on the first and second transition signals TS1 and TS2.

The counter 231 counts each of the first and second transition signals TS1 and TS2 of the current line Hc, and outputs a first count signal CNTA and a second count signal CNTB.

The delay controller 232 determines whether to delay and output some of the bits of the latch data signal in response to the first count signal CNTA and the second count signal CNTB. The delay controller 232 may output control signals CT1, CT2, . . . , CTk in response to the first count signal CNTA and the second count signal CNTB.

Each of the delay circuits DC1, DC2, . . . , DCm may delay and output each bit of the latch data signal in response to the control signals CT1, CT2, . . . , CTk. The delay circuits DC1, DC2, . . . , DCm may correspond to the data lines DL1, DL2, . . . , DLm, respectively.

Each of the delay circuits DC1, DC2, . . . , DCm may include 'k' delays. In other words, the delay circuit DC1 includes delays DC11, DC12, . . . , DC1k. The delay circuit DC2 includes delays DC21, DC22, . . . , DC2k. The delay circuit DCm includes delays DCm1, DCm2, . . . , DCmk.

For example, when each of the control signals CT1, CT2, . . . , CTk is at a low level, the delay circuits DC1, DC2, . . . , DCm may output the latch data signal as the delay data signal as it is without delaying the latch data signal. In other words, the latch data signal may not be delayed when each of the control signals CT1, CT2, . . . , CTk is at a low level.

However, when the control signal CTk is at a high level, the delays DC1k, DC2k, . . . , DCmk corresponding to the most significant bit in the delay circuits DC1, DC2, . . . , DCm delay the latch data signal and output the delayed latch data signal as the delay data signal. When the control signal CT1 is at a high level, the delays DC11, DC21, . . . , DCm1 corresponding to the least significant bit in the delay circuits DC1, DC2, . . . , DCm delay the latch data signal and output the delayed latch data signal as the delay data signal.

Each of the level shifters LS1, LS2, . . . , LSm outputs a level shift data signal obtained by changing a voltage level of the delay data signal output from the delay circuits DC1, DC2, . . . , DCm.

Each of the level shifters LS1, LS2, . . . , LSm may include 'k' level shift units. In other words, the level shifter LS1 includes level shift units LS11, LS12, . . . , LS1k. The level shifter LS2 includes level shift units LS21, LS22, . . . , LS2k. The level shifter LSm includes level shift units LSm1, LSm2, . . . , LSmk.

The level shifters LS1, LS2, . . . , LSm output level shift data signals LD1[k:1], LD2[k:1], and LDm[k:1], respectively.

The gamma voltage generator 240 generates gamma voltages V0 to V255. In an embodiment, the gamma voltages V0 to V255 may have different voltage levels.

The decoders DCD1, DCD2, . . . , DCDm select a gamma voltage corresponding to the level shift data signals LD1[k:1], LD2[k:1], LDm[k:1] among the gamma voltages V0 to V255, respectively, and output decoder output signals DOUT1, DOUT2, . . . , DOUTm.

The output buffers OUT1, OUT2, . . . , OUTm output the decoder output signals DOUT1, DOUT2, . . . , DOUTm from the decoders DCD1, DCD2, DCDm as data signals D1, D2, . . . , Dm to the data lines DL1, DL2, . . . , DLm.

Figure 3:
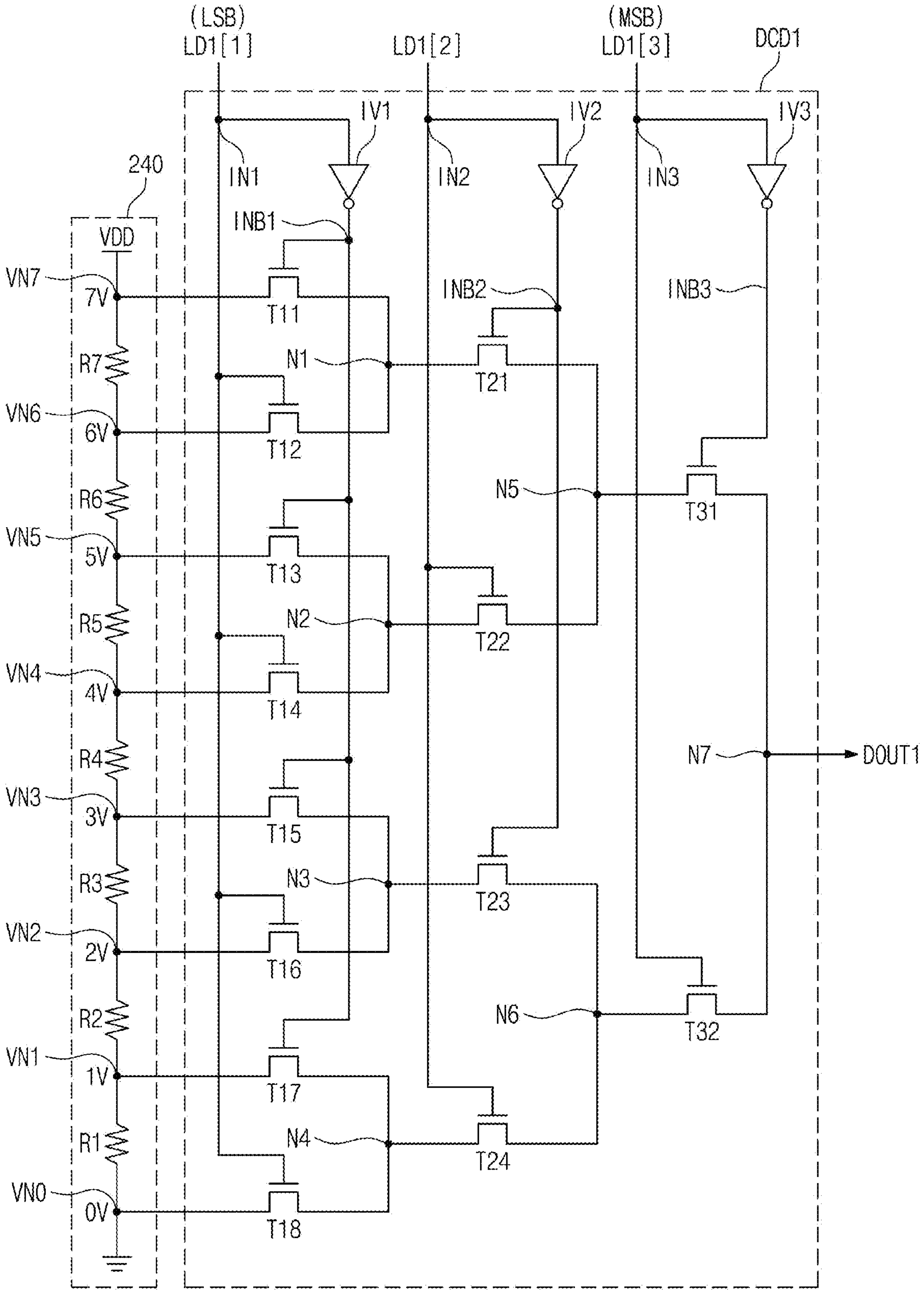
FIG. 3 is a circuit diagram illustrating a gamma voltage generator and a decoder, according to an embodiment of the present disclosure.

FIG. 3 is a circuit diagram illustrating the gamma voltage generator 240 and the decoder DCD1.

Referring to FIG. 3, the gamma voltage generator 240 includes resistors R1, R2, R3, R4, R5, R6 and R7 that are sequentially connected in series between a voltage node VN0 receiving a ground voltage and a voltage node VN7 receiving a power supply voltage VDD. Resistance values of the resistors R1 to R7 may be the same as or different from one another.

FIG. 3 illustrates that the decoder DCD1 receives 3-bit level shift data signals LD1 [1], LD1[2], and LD1[3], but the present disclosure is not limited thereto. The bit width of the level shift data signal received by the decoder DCD1 may be variously changed. In addition, the circuit configuration of the decoder DCD1 may be changed depending on the bit width of the level shift data signal.

In addition, although only the decoder DCD1 is illustrated in FIG. 3, the decoders DCD2, . . . , DCDm illustrated in FIG. 2 may also include a circuit configuration similar to that of the decoder DCD1.

The decoder DCD1 includes transistors T11, T12, T13, T14, T15, T16, T17 and T18, T21 to T24, T31, and T32, and inverters IV1, IV2, and IV3.

The inverter IV1 is connected between an input node IN1 and an inverter output node INB1. The inverter IV2 is connected between an input node IN2 and an inverter output node INB2. The inverter IV3 is connected between an input node IN3 and an inverter output node INB3.

The transistor T11 is connected between the voltage node VN7 and a node N1, and includes a gate electrode connected to the inverter output node INB1. The transistor T12 is connected between a voltage node VN6 and the node N1, and includes a gate electrode connected to the input node IN1.

The transistor T13 is connected between the voltage node VN5 and a node N2, and includes a gate electrode connected to the inverter output node INB1. The transistor T14 is connected between a voltage node VN4 and the node N2, and includes a gate electrode connected to the input node IN1.

The transistor T15 is connected between a voltage node VN3 and a node N3, and includes a gate electrode connected to the inverter output node INB1. The transistor T16 is connected between a voltage node VN2 and the node N3, and includes a gate electrode connected to the input node IN1.

The transistor T17 is connected between the voltage node VN1 and a node N4, and includes a gate electrode connected to the inverter output node INB1. The transistor T18 is connected between a voltage node VN0 and the node N4, and includes a gate electrode connected to the input node IN1.

The transistor T21 is connected between the node N1 and a node N5, and includes a gate electrode connected to the inverter output node INB2. The transistor T22 is connected between the node N2 and the node N5, and includes a gate electrode connected to the input node IN2.

The transistor T23 is connected between the node N3 and a node N6, and includes a gate electrode connected to the inverter output node INB2. The transistor T24 is connected between the node N4 and the node N6, and includes a gate electrode connected to the input node IN2.

The transistor T31 is connected between the node N5 and a node N7, and includes a gate electrode connected to the inverter output node INB3. The transistor T32 is connected between the node N6 and the node N7, and includes a gate electrode connected to the input node IN3.

The level shift data signals LD1[1], LD1[2], and LD1[3] are input to the input nodes IN1, IN2, and IN3, respectively.

Each of the transistors T11 to T18, T21 to T24, T31, and T32 may be turned on or off depending on signal levels of the level shift data signals LD1[1], LD1[2], and LD1[3].

Voltage levels of the voltage nodes VN0 to VN7 may be determined depending on the power supply voltage VDD and resistance values of the resistors R1 to R7. The voltage level of the node N7 may be output as the decoder output signal DOUT1. For example, the voltage levels of the voltage nodes VN0 to VN7 may be 0V, 1V, 2V, 3V, 4V, 5V, 6V, and 7V, respectively.

As one of the voltage nodes VN0 to VN7 is electrically connected to the node N7 through the turned on transistors among the transistors T11 to T18, T21 to T24, T31, and T32, a voltage level of the decoder output signal DOUT1 may be determined.

For example, when the transistors T11, T21, and T31 are turned on, the voltage level of the decoder output signal DOUT1 may be the voltage level of the voltage node VN7, in other words, 7V.

Figure 4A:
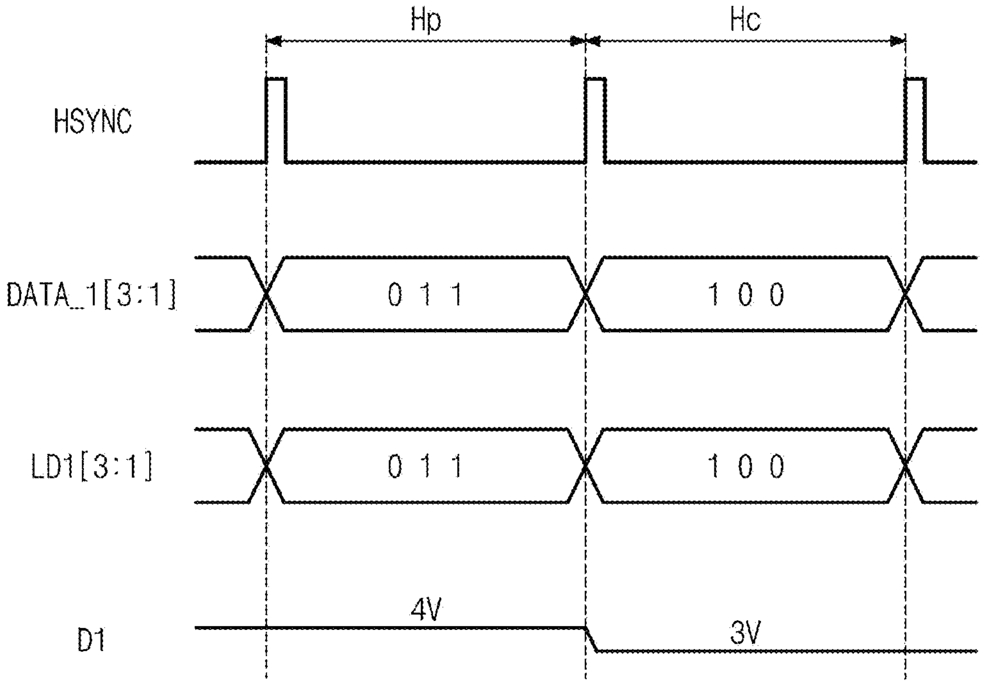
FIGS. 4A and 4B are diagrams illustrating a change in a data signal, according to a change in a latch data signal in a previous line and a current line, according to an embodiment of the present disclosure.
Figure 4B:
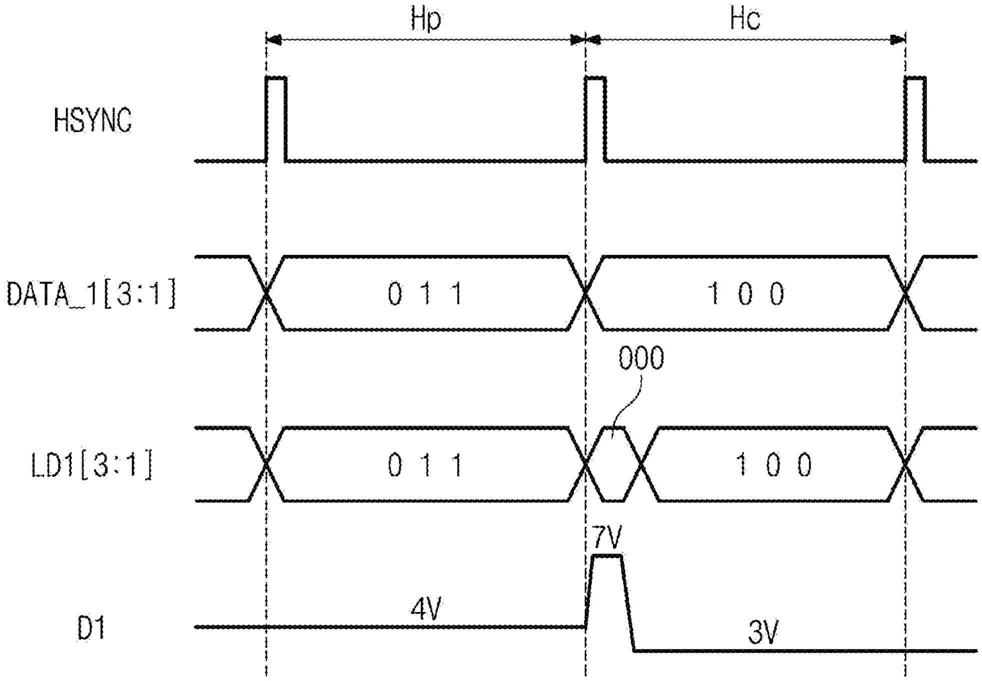

FIGS. 4A and 4B are diagrams illustrating a change in the data signal D1 according to a change in the latch data signal DATA_1 [3:1] in the previous line Hp and the current line Hc.

Figure 5A:
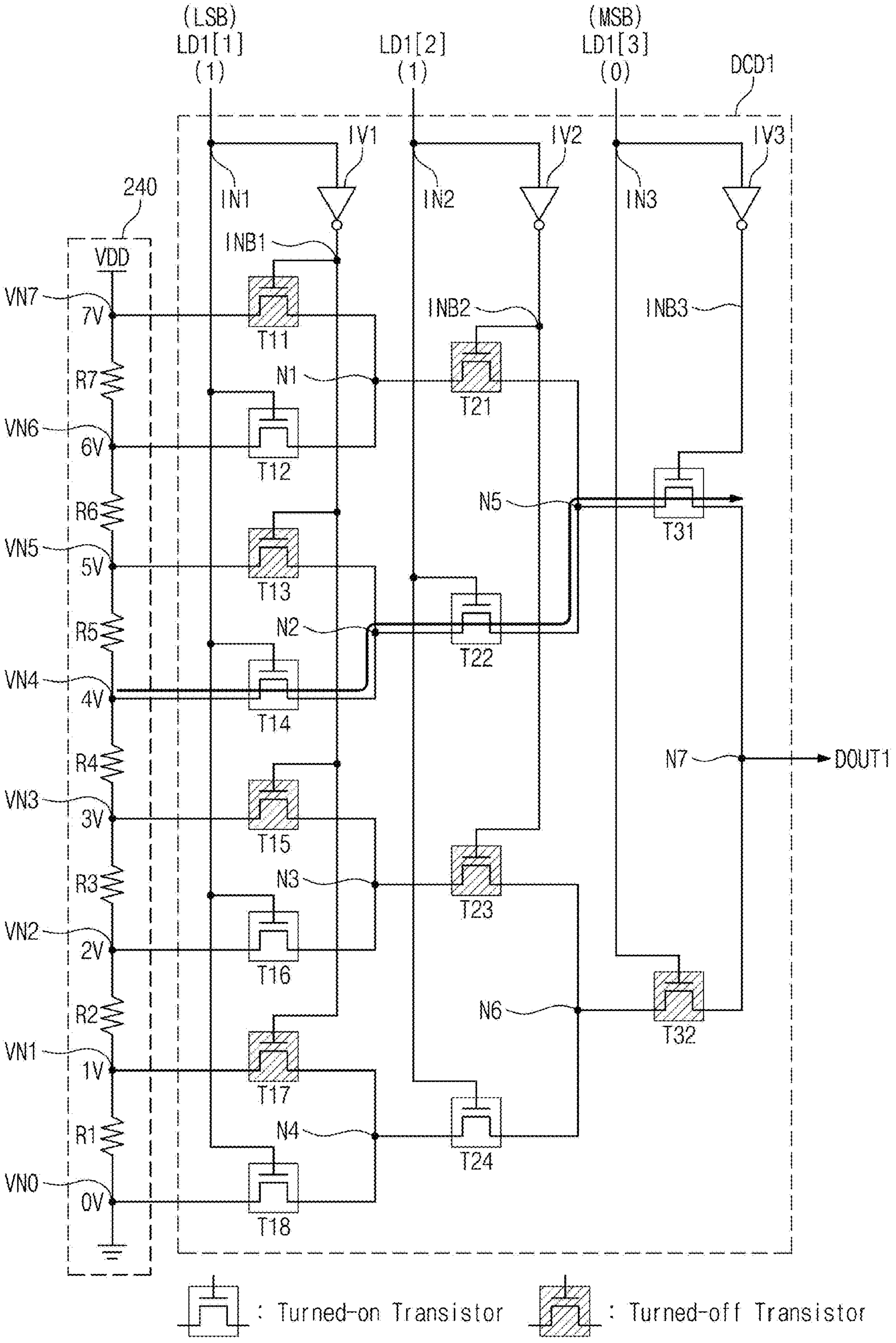
FIG. 5A is a diagram illustrating an operation of a decoder when a latch data signal is '011', according to an embodiment of the present disclosure.

FIG. 5A is a diagram illustrating an operation of the decoder DCD1 when the latch data signal DATA_1[3:1] is '011'.

Figure 5B:
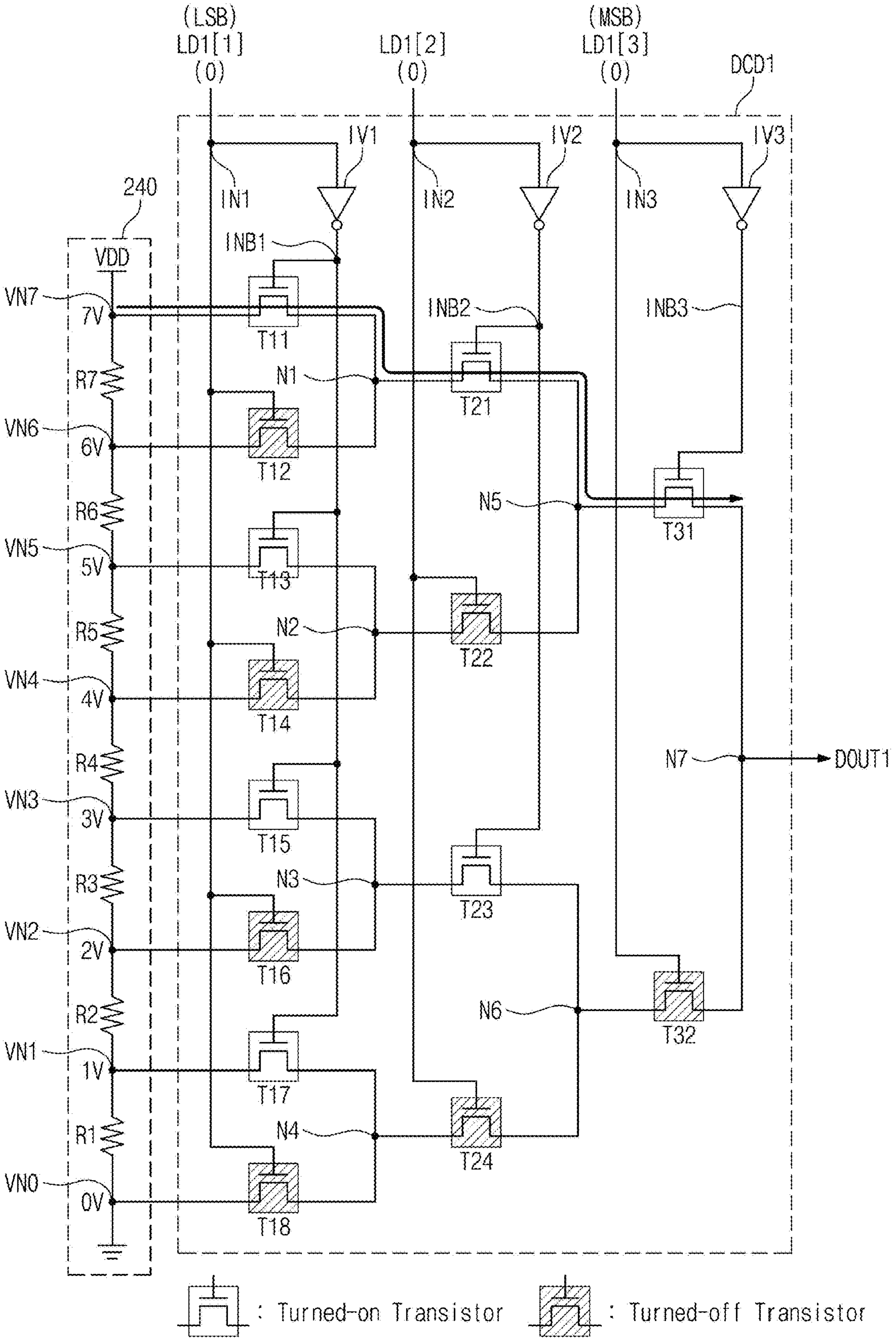
FIG. 5B is a diagram illustrating an operation of a decoder when a latch data signal is '000', according to an embodiment of the present disclosure.

FIG. 5B is a diagram illustrating an operation of the decoder DCD1 when the latch data signal DATA_1 [3:1] is '000'.

Figure 5C:
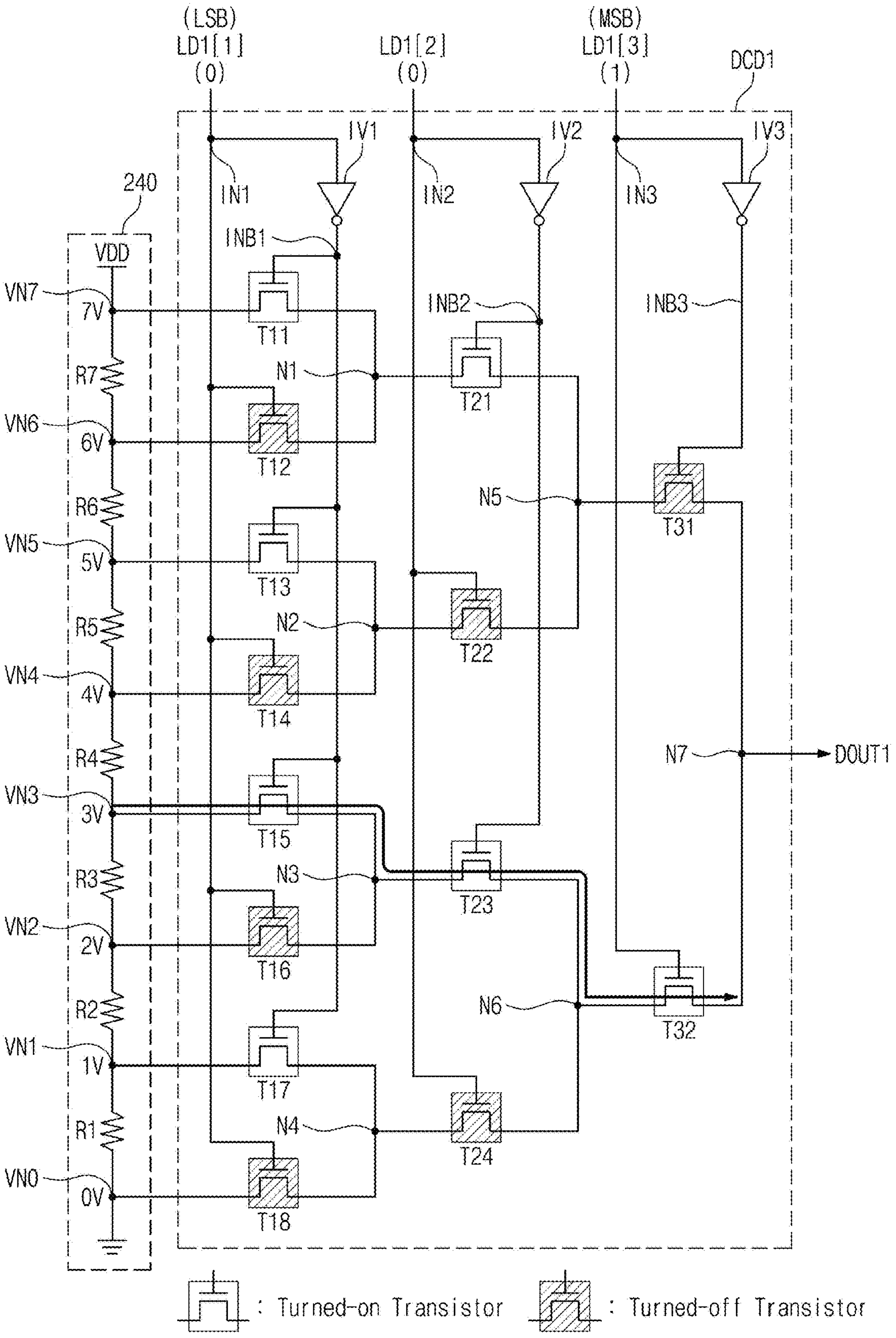
FIG. 5C is a diagram illustrating an operation of a decoder when a latch data signal is '100', according to an embodiment of the present disclosure.

FIG. 5C is a diagram illustrating an operation of the decoder DCD1 when the latch data signal DATA_1 [3:1] is '100'.

Referring to FIG. 4A, it is assumed that the latch data signal DATA_1 [3:1] of the previous line Hp is a binary number '01', and the latch data signal DATA_1 [3:1] of the current line Hc is a binary number '100', which is changed.

As illustrated in FIG. 5A, when the level shift data signal LD1[3:1] of the previous line Hp is '011', the transistors T14, T22, and T31 are turned on to electrically connect the node N7 to the voltage node VN4, such that the voltage level of the data signal D1 is 4V. The path from the voltage node VN4 to the node N7 through the turned on transistors T14, T22, and T31 is illustrated by an arrow in FIG. 5A.

As illustrated in FIG. 5C, when the level shift data signal LD1 [3:1] of the previous line Hp is '100', the transistors T15, T23, and T32 are turned on to electrically connect the node N7 to the voltage node VN3, such that the voltage level of the data signal D1 is 3V. The path from the voltage node VN3 to the node N7 through the turned on transistors T15, T23, and T32 is illustrated by an arrow in FIG. 5C.

In an ideal case, the level shift data signal LD1 [3:1] may be directly changed from '011' to '100' depending on a change of the latch data signal DATA_1 [3:1], and the voltage level of the data signal D1 may be directly changed from 4V corresponding to '011' to 3V corresponding to '100'.

Referring to FIG. 4B, when the latch data signal DATA_1 [3:1] of the previous line Hp is '011', and the latch data signal DATA_[3:1] of the current line He is changed to '100', the level shift data signal LD1 [3:1] may be changed from '011' to '000' and then may be changed to '100' due to various reasons (e.g., a delay time deviation of signal lines, a signal rising time and signal polling time deviations between the level shifters LS11, LS12, . . . , LS1k (refer to FIG. 2), etc.). In other words, the lower 2 bits of the latch data signal DATA_[3:1] of the previous line Hp are directly changed from '11' to '00' and may be output as a level shift data signal LD1 [2:1], and the bit '1', which is the most significant bit, may be output as the level shift data signal LD1 [3:1] after a predetermined time delay.

As illustrated in FIG. 5B, when the level shift data signal LD1 [3:1] is '000', the transistors T11, T21, and T31 are turned on to electrically connect the node N7 to the voltage node VN7, such that the voltage level of the data signal D1 is 7V. The path from the voltage node VN7 to the node N7 through the turned on transistors T11, T21, and T31 is illustrated by an arrow in FIG. 5B.

In this case, the voltage level of the data signal D1 may be changed from 4V corresponding to '011' to 3V corresponding to '100' after passing through 7V corresponding to '000'. A state in which the voltage level of the data signal D1 is 7V is a meta-stable state.

Figure 6:
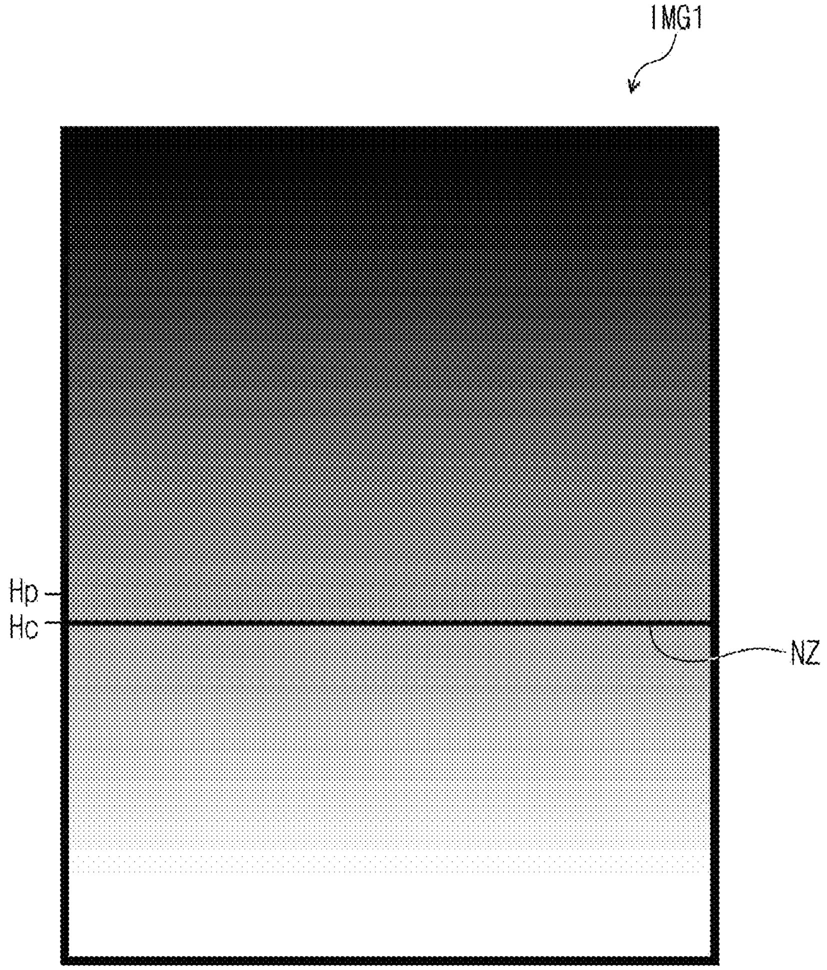
FIG. 6 is a diagram illustrating an image displayed on a display device.

FIG. 6 is a diagram illustrating an image IMG1 displayed on a display device.

Referring to FIG. 6, it is assumed that a latch data signal DATA_1 [8:1] of the previous line Hp is a binary number '1111', and a latch data signal DATA_1 [8:1] of the current line He is a binary number '0000', which is changed.

Referring to FIGS. 2 and 6, in an ideal case, a level shift data signal LD1 [8:1] changes directly from '0111 111' to '1000 0000' according to a change of the latch data signal DATA_1 [8:1].

When a time (e.g., a rising time) at which the output of the level shifters LS1, LS2, . . . , LSm changes from a low level to a high level is greater than a time (e.g., a polling time) at which the output of the level shifters LS1, LS2, . . . , LSm changes from a high level to a low level, the level shift data signal LD1 [8:1] is changed from '0111 1111' to '0000 0000', and then may be changed to '1000 0000'.

When the level shift data signal LD1 [8:1] is '0000 0000', the image IMG1 displayed on the display device DD corresponds to a black grayscale, and thus unwanted noise NZ may be included. Even if the noise NZ appears on the image IMG1 for a short time, a line noise may be recognized by a user.

FIG. 7 is a diagram for describing an operation of a transition detector and the counter illustrated in FIG. 2.

Referring to FIGS. 2 and 7, the transition detector 220 determines whether each of the latch data signals DATA_1 [k:1], DATA_2[k:1], . . . , DATA_m[k:1] corresponds to a worst pattern. In other words, the transition detector 220 compares the latch data signal of the current line He with the latch data signal of the previous line Hp, and outputs the first and second transition signals TS1 and TS2.

When the latch data signal of the current line Hc and the latch data signal of the previous line Hp correspond to a first worst pattern, the first transition signal TS1 has a first value (e.g., '1'). When the latch data signal of the current line Hc and the latch data signal of the previous line Hp do not correspond to the first worst pattern, the first transition signal TS1 has a second value (e.g., '0').

When the latch data signal of the current line He and the latch data signal of the previous line Hp correspond to a second worst pattern, the second transition signal TS2 has a first value (e.g., '1'). When the latch data signal of the current line He and the latch data signal of the previous line Hp do not correspond to the second worst pattern, the second transition signal TS2 has a second value (e.g., '0').

The first worst pattern is a pattern when the latch data signal of the previous line Hp is '0111 1111' and the latch data signal of the current line He is '1000 0000'. The second worst pattern is a pattern when the latch data signal of the previous line Hp is '1000 0000' and the latch data signal of the current line He is '0111 1111'. In other words, the worst pattern is when the most significant bit of the latch data signal of the previous line Hp is a first bit value, remaining lower bits except for the most significant bit of the previous line Hp are second bit values, respectively, the most significant bit of the latch data signal of the current line He is the second bit value, and remaining lower bits except for the most significant bit of the current line He are the first bit values, respectively. Here, the first bit value is 0 and the second bit value is 1. However, the present disclosure is not limited thereto and the first bit value may be 1 and the second bit value may be 0.

The counter 231 counts the number of first values of the first transition signal TS1 in one horizontal line and outputs the first count signal CNTA. The counter 231 counts the number of first values of the second transition signal TS2 in one horizontal line and outputs the second count signal CNTB.

The delay controller 232 may output the control signals CT1, CT2, . . . , CTk in response to the first count signal CNTA and the second count signal CNTB.

Figure 8:
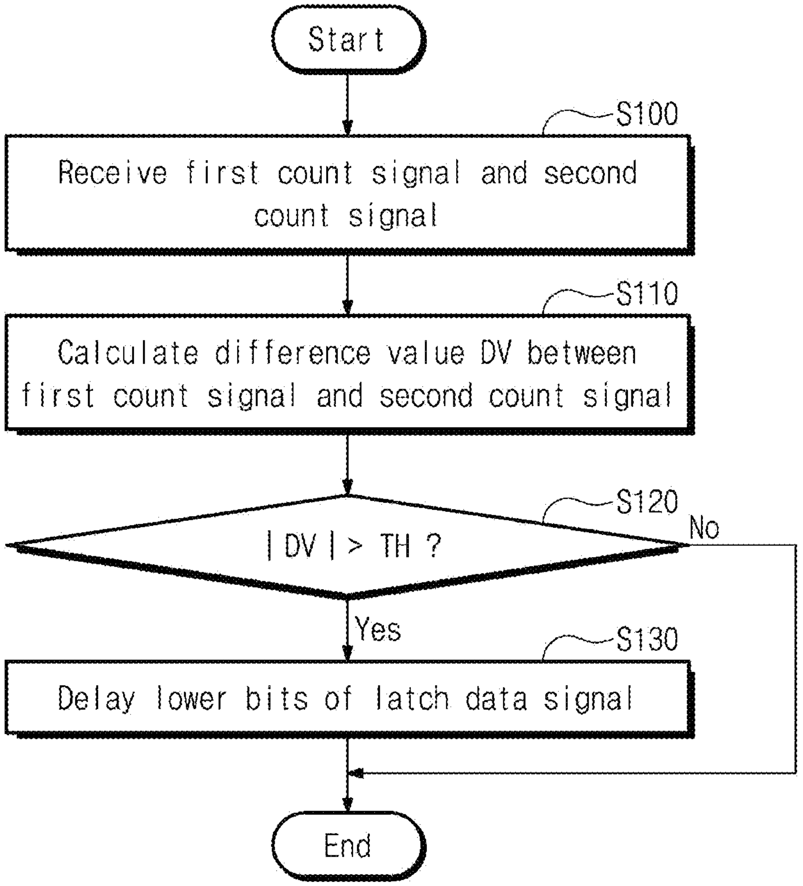
FIG. 8 is a flowchart illustrating an operation of a delay controller, according to an embodiment of the present disclosure.

FIG. 8 is a flowchart illustrating an operation of a delay controller, according to an embodiment of the present disclosure.

Referring to FIGS. 2 and 8, the delay controller 232 receives the first count signal CNTA and the second count signal CNTB (operation S100).

The delay controller 232 calculates a difference value DV between the first count signal CNTA and the second count signal CNTB (operation S110).

The delay controller 232 compares an absolute value of the difference value DV with a reference value TH (operation S120).

When the absolute value of the difference value DV is greater than the reference value TH, the delay controller 232 outputs the control signals CT1, CT2, . . . , CTk to the delay circuits DC1, DC2, . . . , DCm such that the output of the lower bits of the latch data signal is delayed (operation S130).

In one embodiment, the delay controller 232 may output the control signals CT1, CT2, . . . , CTk such that the outputs of the lower bits DATA_1[k−1:1], DATA_2[k−1:1], . . . , DATA_m[k−1:1] except for the most significant bits DATA_[k], DATA_2[k], . . . , DATA_m[k] of each of the latch data signals DATA_1[k:1], DATA_2[k:1], . . . , DATA_m[k:1] are delayed. For example, the control signal CTk may have a second value (e.g., '0'), and the control signals CT1, CT2, . . . , CTk−1 may have a first value (e.g., '1').

Figure 9A:
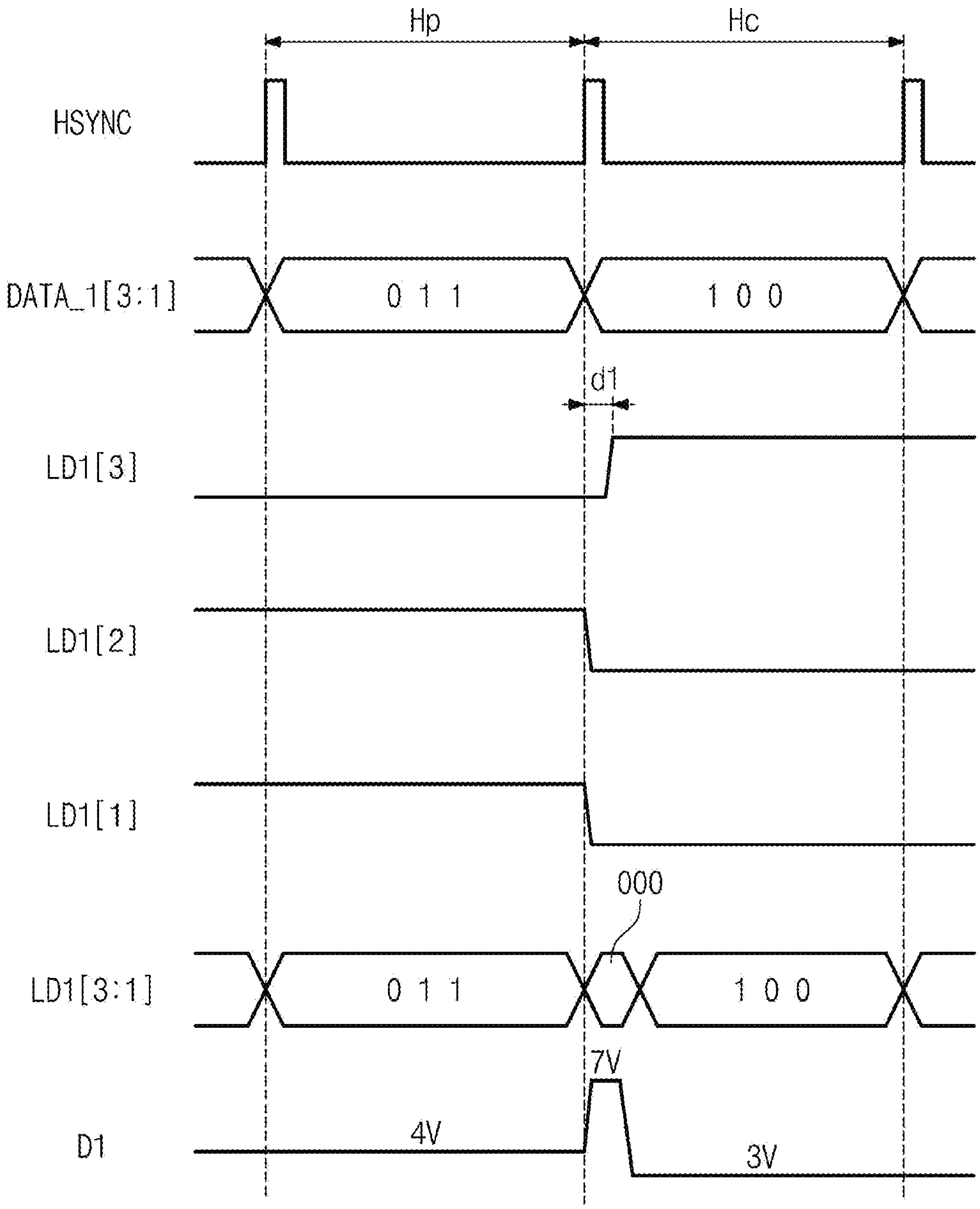
FIGS. 9A and 9B are diagrams illustrating a change in a data signal, according to a change in a latch data signal in a previous line and a current line, according to an embodiment of the present disclosure.
Figure 9B:
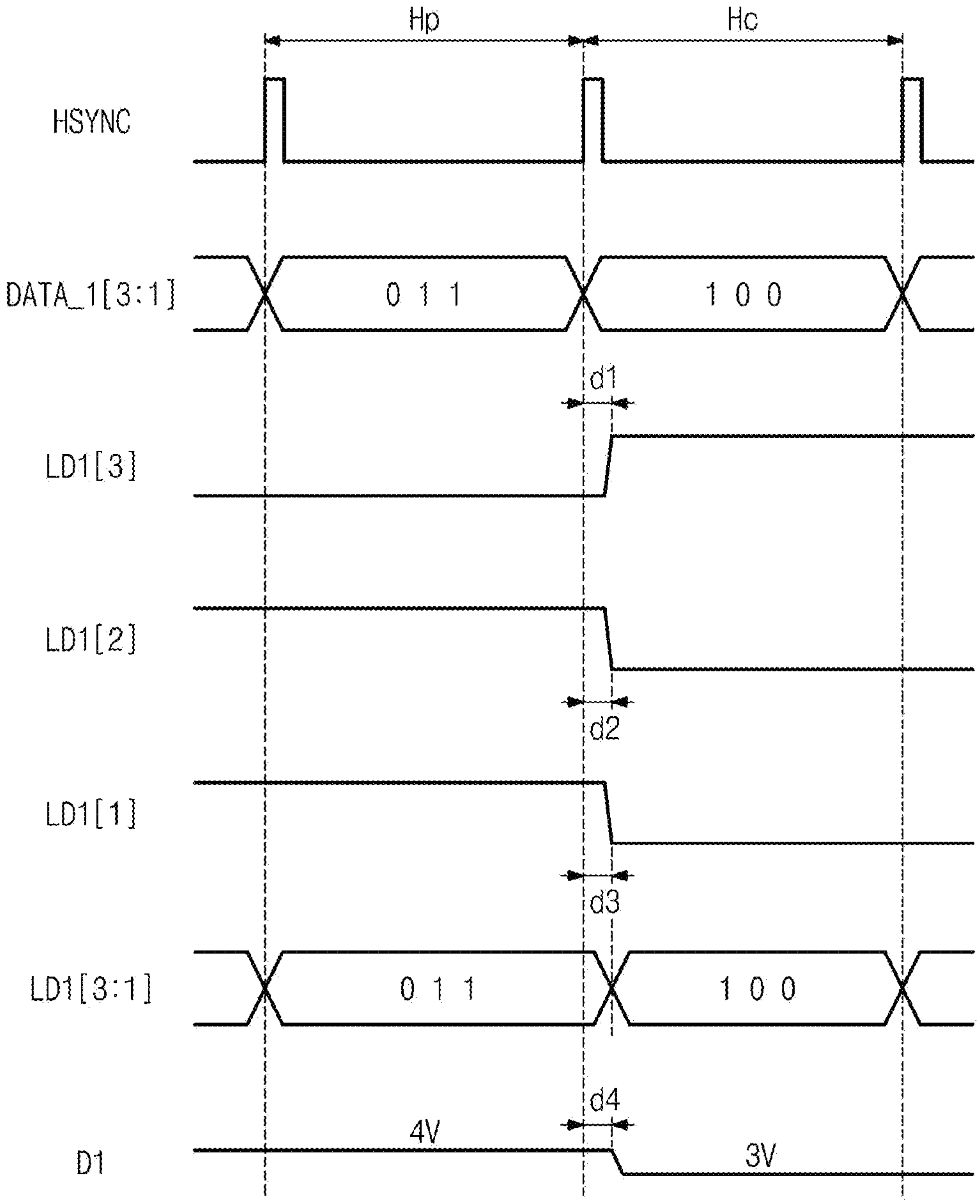

FIGS. 9A and 9B are diagrams illustrating a change in the data signal D1 according to a change in the latch data signal DATA_1 [3:1] in the previous line Hp and the current line Hc.

Referring to FIG. 9A, it is assumed that the latch data signal DATA_1[3:1] of the previous line Hp is a binary number '011', and the latch data signal DATA_[3:1] of the current line Hc is a binary number '100', which is changed.

As illustrated in FIG. 5A, when the level shift data signal LD1 [3:1] of the previous line Hp is '011', the transistors T14, T22, and T31 are turned on to electrically connect the node N7 to the voltage node VN4, such that the voltage level of the data signal D1 is 4V.

When the latch data signal DATA_1 [3:1] is changed from '011' to '100', the lower 2 bits LD1[2] and LD1[1] of the level shift data signal LD1 [3:1] may be changed to '0' immediately, and the most significant bit LD1[3] may be changed to '1' after delaying by a delay time d1. In this case, the level shift data signal LD1 [3:1] provided to the decoder DCD1 may be temporarily '000'.

In this case, the voltage level of the data signal D1 may be changed from 4V corresponding to '011' to 3V corresponding to '100' after passing through 7V corresponding to '000'. In other words, the voltage level of the data signal D1 may experience a voltage spike when transitioning from '011' to '100'.

As described in FIG. 8, when the absolute value of the difference value DV is greater than the reference value TH, the delay controller 232 outputs the control signals CT1, CT2, . . . , CTk to the delay circuits DC1, DC2, . . . , DCm such that the output of the lower bits of the latch data signal is delayed.

Referring to FIG. 9B, among the control signals CT1, CT2, . . . , CTk, when each of the control signals CT1 and CT2 is '1', and remaining control signals CTk (k=3 in the example illustrated in FIG. 9B) is '0', the delays DC11 and DC12 in the delay circuit DC1 delay and output the lower 2 bits DATA_1 [2:1] of the latch data signal DATA_1 [3:1] by predetermined times d2 and d3, respectively. In an embodiment, the predetermined times d2 and d3 may be the same to each other.

As a result, the voltage level of the data signal D1 may be changed from 4V corresponding to '011' to 3V corresponding to '100' after a delay of a predetermined time d4. In other words, the voltage level of the data signal D1 may not experience a voltage spike when transitioning from '011' to '100'. In one embodiment, the predetermined times d2, d3, and d4 may be actually the same. In addition, each of the predetermined times d2, d3, and d4 may be the same as the delay time d1 by setting the delay time of each of the delays DC11 and DC12.

Although the output time of the data signal D1 in the current line He is delayed by the predetermined time d4 from the synchronization signal HSYNC, it is possible to prevent the level shift data signal LD1 [3:1] from being output as an unwanted value '000' (refer to FIG. 9A). In other words, the voltage spike may be prevented.

Figure 10A:
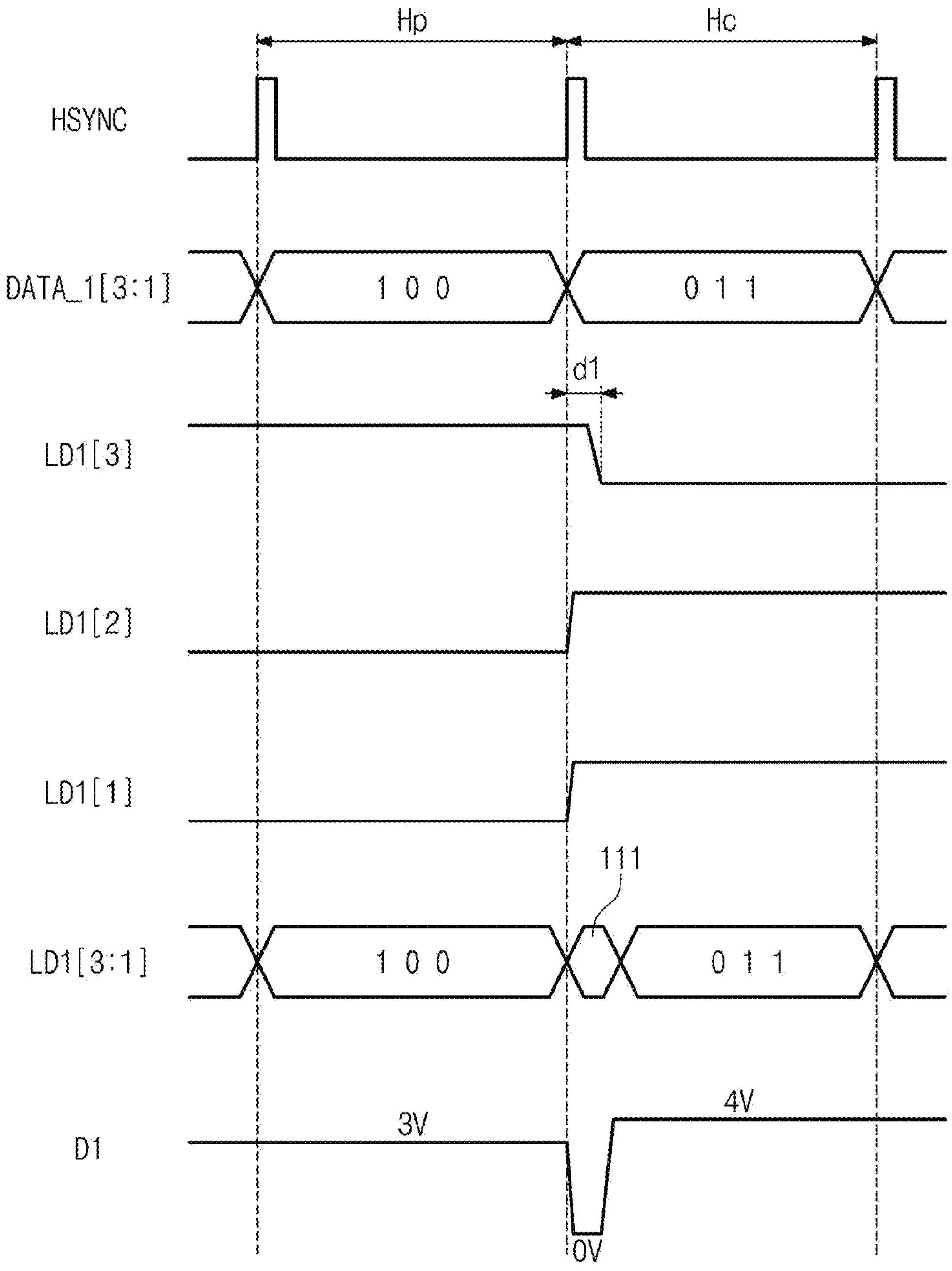
FIGS. 10A and 10B are diagrams illustrating a change in a data signal, according to a change in a latch data signal in a previous line and a current line.
Figure 10B:
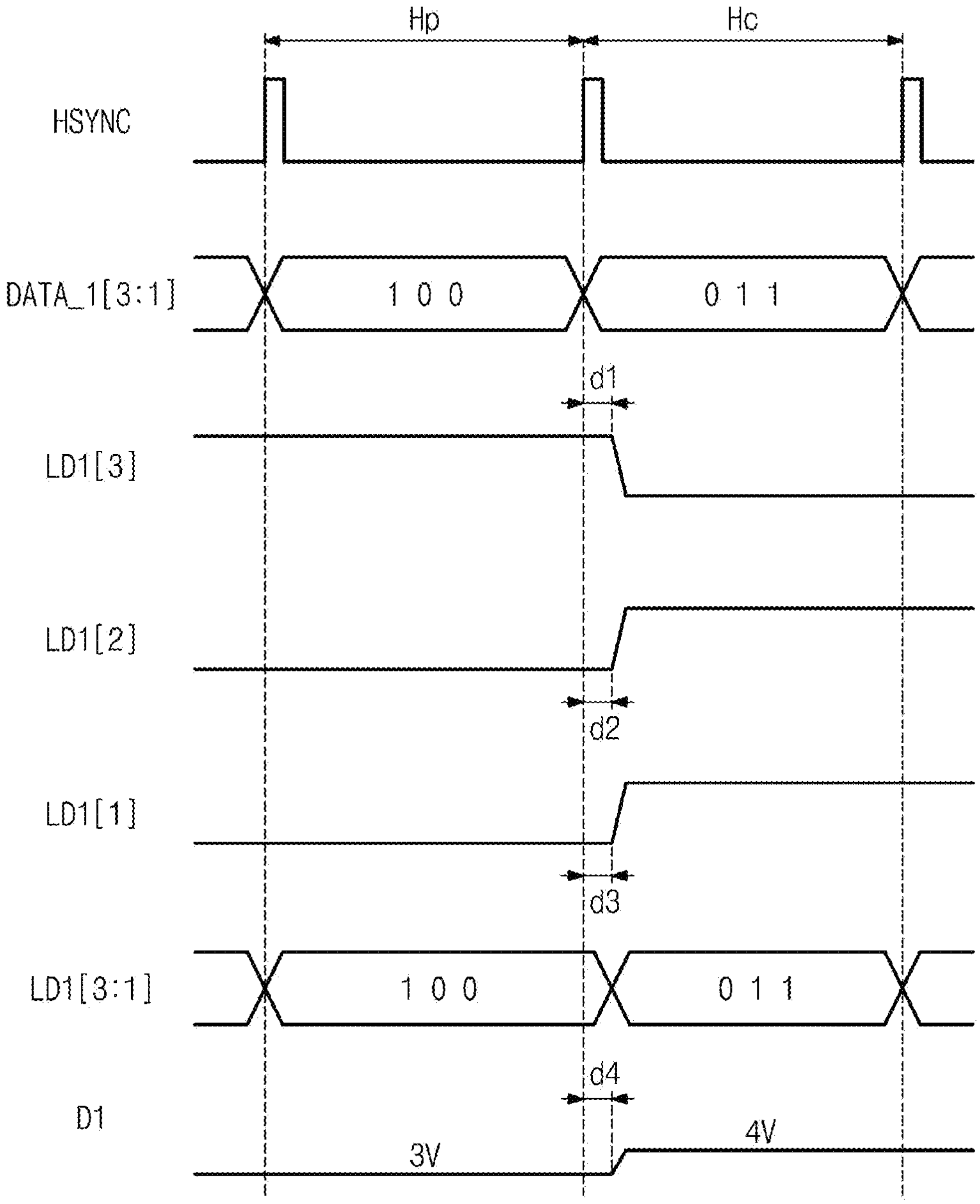

FIGS. 10A and 10B are diagrams illustrating a change in the data signal D1 according to a change in the latch data signal DATA_1 [3:1] in the previous line Hp and the current line Hc.

Referring to FIG. 10A, it is assumed that the latch data signal DATA_1 [3:1] of the previous line Hp is '100', and the latch data signal DATA_1 [3:1] of the current line He is '011', which is changed.

As illustrated in FIG. 5C, when the level shift data signal LD1 [3:1] of the previous line Hp is '100', the transistors T15, T23, and T32 are turned on to electrically connect the node N7 to the voltage node VN3, such that the voltage level of the data signal D1 is 3V.

When the latch data signal DATA_1 [3:1] is changed from '100' to '011', the lower 2 bits LD1[2] and LD1[1] of the level shift data signal LD1 [3:1] may be changed to '1' immediately, and the most significant bit LD1[3] may be changed to '0' after delaying by a delay time d1. In this case, the level shift data signal LD1 [3:1] provided to the decoder DCD1 may be temporarily '111'.

In this case, the voltage level of the data signal D1 may be changed from 3V corresponding to '100' to 4V corresponding to '011' after passing through 0V corresponding to '111'. In other words, the voltage level of the data signal D1 may experience a voltage drop when transitioning from '100' to '011'.

As described in FIG. 8, when the absolute value of the difference value DV is greater than the reference value TH, the delay controller 232 outputs the control signals CT1, CT2, . . . , CTk to the delay circuits DC1, DC2, . . . , DCm such that the output of the lower bits of the latch data signal is delayed.

Referring to FIG. 10B, among the control signals CT1, CT2, . . . , CTk, when each of the control signals CT1 and CT2 is '1', and remaining control signals CTk (k=3 in the example illustrated in FIG. 10B) is '0', the delays DC11 and DC12 in the delay circuit DC1 delay and output the lower 2 bits DATA_[2:1] of the latch data signal DATA_1 [3:1] by predetermined times d2 and d3, respectively. In an embodiment, the predetermined times d2 and d3 may be the same to each other.

As a result, the voltage level of the data signal D1 may be changed from 3V corresponding to '100' to 4V corresponding to '011' after a delay of a predetermined time d4. In other words, the voltage level of the data signal D1 may not experience a voltage drop when transitioning from '100' to '011'. In one embodiment, the predetermined times d2, d3, and d4 may be actually the same. In addition, each of the predetermined times d2, d3, and d4 may be the same as the delay time d1 by setting the delay time of each of the delays DC11 and DC12.

Although the output time of the data signal D1 in the current line He is delayed by the predetermined time d4 from the synchronization signal HSYNC, it is possible to prevent the level shift data signal LD1 [3:1] from being output as an unwanted value '111' (refer to FIG. 10A). In other words, the voltage drop may be prevented.

As illustrated in FIG. 9A, when the latch data signal DATA_1[3:1] of the previous line Hp is '011', and the latch data signal DATA_1 [3:1] of the current line He is changed as '100', the voltage level of the data signal provided to the data line DL1 (refer to FIG. 1) may change in the order of 4V, 7V, and 3V.

As illustrated in FIG. 10A, when the latch data signal DATA_1[3:1] of the previous line Hp is '100', and the latch data signal DATA_1 [3:1] of the current line He is changed as '01 1', the voltage level of the data signal provided to the data line DL1 (refer to FIG. 1) may change in the order of 3V, 0V, and 4V.

When the latch data signal DATA_1 [3:1] is changed from '011' to '100', a load current of the data line DL1 may rapidly change as the voltage of the data line DL1 rises from 4V to 7V, and, when the latch data signal DATA_1 [3:1] is changed from '100' to '01', the load current of the data line DL1 may rapidly change as the voltage of the data line DL1 drops from 3V to V.

In one horizontal line, when the number of latch data signal DATA_1 [3:1] changed from '011' to '100' is greater than the number of latch data signal DATA_1 [3:1] changed from '100' to '011', or the number of latch data signal DATA_1 [3:1] changed from '100' to '011' is greater than the number of latch data signal DATA_1 [3:1] changed from '011' to '100', a current flowing through the data lines DL1 to DLm (refer to FIG. 1) may be changed rapidly. A rapid change in the current of the data lines DL1 to DLm may affect the display quality.

Therefore, in operation S120 illustrated in FIG. 8, the absolute value of the difference value DV between the first count signal CNTA and the second count signal CNTB is compared with the reference value TH. When the absolute value of the difference value DV is greater than the reference value TH, the delay controller 232 outputs the control signals CT1, CT2, . . . , CTk to the delay circuits DC1, DC2, . . . , DCm such that the output of the lower bits of the latch data signal is delayed (operation S130).

As illustrated in FIGS. 9B and 10B, it is possible to prevent a rapid change in the voltage level of the data signal D1 by delaying and outputting some bits of the latch data signal DATA_[3:1]. Therefore, when an image of a specific worst pattern is displayed on the display device DD, it is possible to prevent the display quality from being deteriorated.

Figure 11:
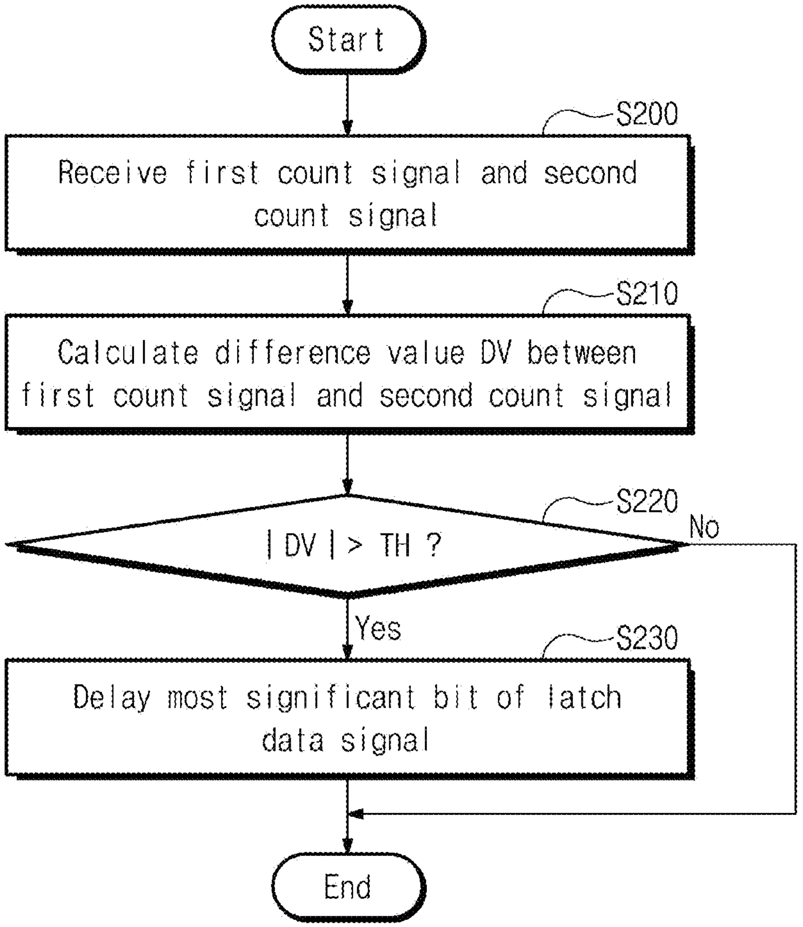
FIG. 11 is a flowchart illustrating an operation of a delay controller, according to an embodiment of the present disclosure.

FIG. 11 is a flowchart illustrating an operation of a delay controller, according to an embodiment of the present disclosure.

Referring to FIGS. 2 and 11, the delay controller 232 receives the first count signal CNTA and the second count signal CNTB (operation S200).

The delay controller 232 calculates the difference value DV between the first count signal CNTA and the second count signal CNTB (operation S210).

The delay controller 232 compares an absolute value of the difference value DV with the reference value TH (operation S220).

When the absolute value of the difference value DV is greater than the reference value TH, the delay controller 232 outputs the control signals CT1, CT2, . . . , CTk to the delay circuits DC1, DC2, . . . , DCm such that the output of the most significant bit of the latch data signal is delayed (operation S230).

When the latch data signal DATA_1 [3:1] of the previous line Hp is '011', and the latch data signal DATA_1[3:1] of the current line He is changed to '100', the level shift data signal LD1 [3:1] may be changed from '011' to '111' and then may be changed to '100' due to various reasons (e.g., a delay time deviation of signal lines, a signal rising time and signal polling time deviations between the level shifters LS11, LS12, . . . , LS1k (refer to FIG. 2), etc.). For example, the most significant bit of the latch data signal DATA_1 [3:1] of the previous line Hp is directly changed from '0' to '1', and the lower 2 bits are delayed by a predetermined time and then may be output as the level shift data signal LD1 [3:1].

In this case, the voltage level of the data signal D1 may be changed from 4V corresponding to '011' to 3V corresponding to '100' after passing through 0V corresponding to '111'. A state in which the voltage level of the data signal D1 is 0V is a meta-stable state.

However, in operation S230, under the control of the delay controller 232, the delays DC1k, DC2k, . . . , DCmk may delay and output the most significant bit of the latch data signal DATA_1 [3:1] by a predetermined time. Therefore, the level shift data signal LD1 [3:1] may be directly changed from '011' to '100'. Therefore, there may not be a voltage drop in the transition from 4V to 3V.

Figure 12:
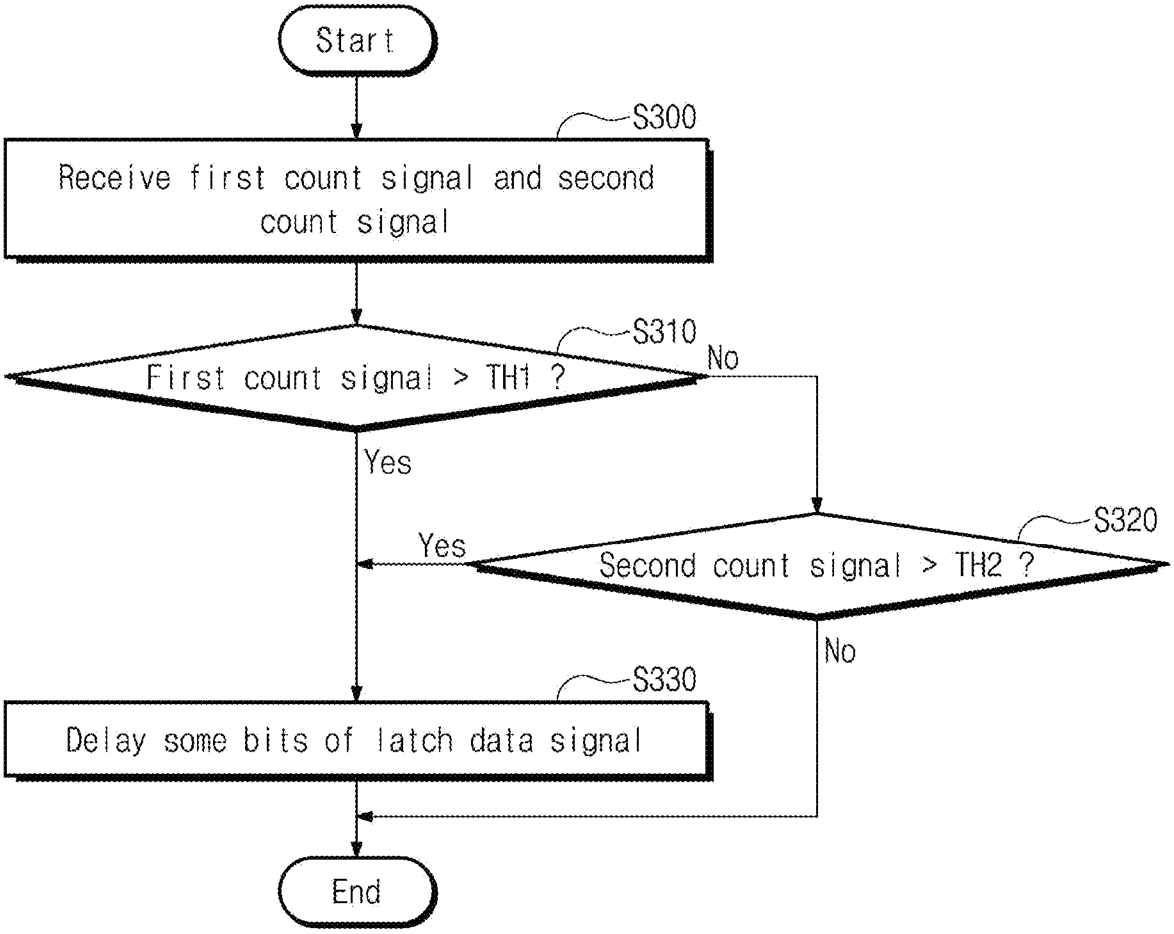
FIG. 12 is a flowchart illustrating an operation of a delay controller, according to an embodiment of the present disclosure.

FIG. 12 is a flowchart illustrating an operation of a delay controller, according to an embodiment of the present disclosure.

Referring to FIGS. 2 and 12, the delay controller 232 receives the first count signal CNTA and the second count signal CNTB (operation S300).

The delay controller 232 compares the first count signal CNTA with a first reference value TH1 (operation S310).

When the first count signal CNTA is greater than the first reference value TH1, the delay controller 232 outputs the control signals CT1, CT2, . . . , CTk to the delay circuits DC1, DC2, . . . , DCm such that the output of some bits of the latch data signal is delayed (operation S330).

When the first count signal CNTA is less than the first reference value TH1, the delay controller 232 compares the first count signal CNTA with a second reference value TH2 (operation S320).

When the second count signal CNTB is greater than the second reference value TH2, the delay controller 232 outputs the control signals CT1, CT2, . . . , CTk to the delay circuits DC1, DC2, . . . , DCm such that the output of some bits of the latch data signal is delayed (operation S330).

For example, in one horizontal line, when the number of latch data signal DATA_1 [3:1] changed from '011' to '100' is greater than the first reference value TH1, or the number of latch data signal DATA_1 [3:1] changed from '100' to '011' is greater than the second reference value TH2, a current flowing through the data lines DL1 to DLm (refer to FIG. 1) may be changed rapidly. A rapid change in the current of the data lines DL1 to DLm may affect the display quality. The delay controller 232, however, may control the delays DC1k, DC2k, . . . , DCmk such that some bits (e.g., some of lower bits or the most significant bit) of the latch data signal DATA_1 [3:1] are delayed by a predetermined time. Therefore, the rapid change in the current of the data lines DL1 to DLm may not occur and display quality may be improved.

According an embodiment of the present disclosure, the data driving circuit having the above configurations may adjust an output time of some bits of a latch data signal when the latch data signal output from a latch has a worst pattern. Therefore, it is possible to prevent deterioration of the display quality of the display device due to a time difference at which each of bits of the latch data signal is transferred to the decoder.

Although an embodiment of the present disclosure has been described for illustrative purposes, those skilled in the art will appreciate that various modifications, and substitutions are possible, without departing from the scope and spirit of the disclosure as disclosed in the accompanying claims. In addition, the embodiments disclosed in the present disclosure are not intended to limit the scope of the present disclosure, and all technical ideas within the scope of the following claims and their equivalents should be construed as being included in the scope of the present disclosure.

What is claimed is:

1. A data driving circuit, comprising:

a latch which receives an output image signal and outputs a latch data signal including a plurality of bits;

a transition detector which compares the latch data signal of a current line with the latch data signal of a previous line, and outputs a first transition detection signal based on the comparison;

a delay compensator which outputs a delay data signal obtained by delaying some of the plurality of bits of the latch data signal based on the first transition detection signal;

a level shifter which outputs a level shift data signal obtained by changing a voltage level of the delay data signal; and an output circuit which converts the level shift data signal into a data signal and provides the data signal obtained by converting the level shift data signal to a data line, wherein the delay compensator includes:

a counter which counts a number of the first transition detection signal having a first value in the current line, and outputs a first count signal based on the counted number;

a delay controller which outputs a control signal when the first count signal is greater than a first reference value; and a delay circuit which outputs the delay data signal obtained by delaying some of the plurality of bits of the latch data signal in response to the control signal.

2. The data driving circuit of claim 1, wherein the transition detector outputs the first transition detection signal as the first value when the latch data signal of the current line and the latch data signal of the previous line correspond to a first pattern.

3. The data driving circuit of claim 2, wherein the first pattern is a pattern in which a most significant bit of the latch data signal of the previous line is a first bit value, each of remaining lower bits except for the most significant bit of the latch data signal of the previous line is a second bit value, a most significant bit of the latch data signal of the current line is the second bit value, and each of remaining lower bits except for the most significant bit of the latch data signal of the current line is the first bit value.

4. The data driving circuit of claim 1, wherein the delay circuit outputs the delay data signal by delaying some of lower bits of the plurality of bits of the latch data signal in response to the control signal.

5. The data driving circuit of claim 4, wherein the delay circuit outputs the delay data signal by delaying a most significant bit of the plurality of bits of the latch data signal in response to the control signal.

6. The data driving circuit of claim 4, wherein the delay circuit outputs the delay data signal by delaying remaining bits except for a most significant bit of the plurality of bits of the latch data signal in response to the control signal.

7. A data driving circuit, comprising:

a latch which receives an output image signal and outputs a latch data signal including a plurality of bits;

a transition detector which compares the latch data signal of a current line with the latch data signal of a previous line, and outputs a first transition detection signal based on the comparison;

a delay compensator which outputs a delay data signal obtained by delaying some of the plurality of bits of the latch data signal based on the first transition detection signal;

a level shifter which outputs a level shift data signal obtained by changing a voltage level of the delay data signal; and an output circuit which converts the level shift data signal into a data signal and provides the data signal obtained by converting the level shift data signal to a data line, wherein the delay compensator includes:

a counter which counts a number of the first transition detection signal having a first value in the current line to output a first count signal, and counts a number of a second transition detection signal having the first value to output a second count signal;

a delay controller which outputs a control signal based on a difference value between the first count signal and the second count signal; and a delay circuit which outputs the delay data signal obtained by delaying some of the plurality of bits of the latch data signal in response to the control signal.

8. The data driving circuit of claim 7, wherein the transition detector:

outputs the first transition detection signal as the first value when the latch data signal of the current line and the latch data signal of the previous line correspond to a first pattern, and outputs a second transition detection signal as the first value when the latch data signal of the current line and the latch data signal of the previous line correspond to a second pattern.

9. The data driving circuit of claim 7, wherein the delay controller outputs the control signal such that some of the plurality of bits of the latch data signal are delayed when an absolute value of the difference value is greater than a reference value.

10. The data driving circuit of claim 9, wherein the delay circuit outputs the delay data signal by delaying remaining bits except for a most significant bit of the plurality of bits of the latch data signal in response to the control signal.

11. The data driving circuit of claim 9, wherein the delay circuit outputs the delay data signal by delaying a most significant bit of the plurality of bits of the latch data signal in response to the control signal.

12. A data driving circuit, comprising:

a latch which receives an output image signal and outputs a latch data signal including a plurality of bits;

a transition detector which outputs a first transition detection signal of a first value when the latch data signal of a current line and the latch data signal of a previous line correspond to a first pattern, and outputs a second transition detection signal of the first value when the latch data signal of the current line and the latch data signal of the previous line correspond to a worst pattern;

a delay compensator which outputs a delay data signal obtained by delaying some of the plurality of bits of the latch data signal based on a difference value between a number of the first transition detection signal having the first value in the current line and a number of the second transition detection signal having the first value in the current line;

a level shifter which outputs a level shift data signal obtained by changing a voltage level of the delay data signal; and an output circuit which converts the level shift data signal into a data signal and provides the data signal obtained by converting the level shift data signal to a data line.

13. The data driving circuit of claim 12, wherein the delay compensator includes:

a counter which counts a number of the first transition detection signal having the first value in the current line to output a first count signal, and counts a number of the second transition detection signal having the first value to output a second count signal;

a delay controller which outputs a control signal when an absolute value of a difference value between the first count signal and the second count signal is greater than a reference value; and a delay circuit which outputs the delay data signal obtained by delaying some of the plurality of bits of the latch data signal in response to the control signal.

14. A data driving circuit, comprising:

a latch which receives an image signal and outputs a latch data signal including a plurality of bits;

a transition detector which compares the latch data signal of a current line with the latch data signal of a previous line, and outputs a first transition detection signal based on the comparison, wherein the first transition detection signal has a first value when the latch data signal of the current line and the latch data signal of the previous line correspond to a predetermined pattern;

a delay compensator which outputs a delay data signal obtained by delaying some of the plurality of bits of the latch data signal based on the first transition detection signal;

a level shifter which outputs a level shift data signal obtained by changing a voltage level of the delay data signal; and an output circuit which converts the level shift data signal into a data signal and provides the data signal obtained by converting the level shift data signal to a data line, wherein the predetermined pattern is a pattern in which a most significant bit of the latch data signal of the previous line is a first bit value, each of remaining lower bits except for the most significant bit of the latch data signal of the previous line is a second bit value, a most significant bit of the latch data signal of the current line is the second bit value, and each of remaining lower bits except for the most significant bit of the latch data signal of the current line is the first bit value.

15. The data driving circuit of claim 14, wherein the first bit value is 0 and the second bit value is 1.

* * * * *